United States Patent [19]

Chan

[11] Patent Number: 5,433,565
[45] Date of Patent: Jul. 18, 1995

[54] WINCH BAR

[76] Inventor: Mee P. Chan, 14645-106th Avenue, Surrey, B.C., Canada, V3R 1T2

[21] Appl. No.: 245,701

[22] Filed: May 18, 1994

[51] Int. Cl.⁶ .............................................. B25B 25/00
[52] U.S. Cl. ...................................... 410/103; 74/544; 16/114 R; 254/243
[58] Field of Search ...................... 410/10, 11, 12, 100, 410/103; 74/543, 544, 545, 546, 547; 24/68 CD, 68 CT, 273, 69 T, 69 CT; 254/217, 223, 237, 244, 243; 16/111 R, 112, 114 R, DIG. 24, DIG. 25

[56] References Cited

U.S. PATENT DOCUMENTS

| | | | |
|---|---|---|---|
| 1,523,022 | 1/1925 | Larson | 16/DIG. 24 X |
| 2,738,204 | 10/1952 | Ibey | 280/179 |
| 2,838,281 | 6/1958 | Flippin | 254/164 |
| 3,697,045 | 10/1972 | Farley | 254/51 |
| 3,888,191 | 6/1975 | Jones | 105/477 |
| 4,063,712 | 12/1977 | Arbogast | 254/164 |
| 4,273,484 | 6/1981 | Blanar | 410/100 X |
| 4,510,651 | 4/1985 | Prete, Jr. et al. | 24/68 R |

FOREIGN PATENT DOCUMENTS 523695 4/1956 Canada .................................. 74/544

OTHER PUBLICATIONS

Undate & Catalogue—p. 129.

*Primary Examiner*—Michael S. Huppert
*Assistant Examiner*—James Eller
*Attorney, Agent, or Firm*—Norman M. Cameron

[57] ABSTRACT

There is a winch bar for winding a winch having a winding drum with an annular wall and a circular opening. A plurality of winch bar receiving apertures extend diametrically through the drum on opposite sides of the wall. The winch bar has an outer portion dimensioned to extend through the apertures. The winch bar also has an inner portion larger than the apertures and a first shoulder between the inner portion and the outer portion. The outer portion includes an outer tip which tapers outwardly. There is a first segment of reduced section adjacent the tip and dimensioned to receive the wall of the drum on the first side thereof. A second shoulder is located between the tip and the first segment. There is a second segment of reduced section adjacent the first shoulder and which is dimensioned to receive the wall of the drum on a second side thereof. The bar has a third segment having a larger section than the first and second segments and which is located therebetween. The third segment is dimensioned to fit within the central opening of the drum between the first and second sides of the annular wall.

10 Claims, 3 Drawing Sheets

WINCH BAR

BACKGROUND OF THE INVENTION

This invention relates to winch bars used to tighten straps for securing loads on flat bed trailers.

Tie-down straps are conventionally used for securing cargoes on flat bed truck trailers and the like. Each strap has first end connected to one side of the trailer, typically using a stake or anchor ring secured to the truck deck. The other end of the strap is connected to a winch which is tightened to secure each strap over the load. Each winch conventionally includes a ratchet mechanism and a winding drum. A second end of the strap is fitted into a slot on the winding drum which is rotated using a winch bar. Typically these bars have a tapered end which is inserted into an aperture in the winding drum. The trucker pulls on the bar to tighten the drum which is held in the tightened position by the ratchet mechanism.

However, accidents have occurred as the result of such winch bars slipping out of the winch when in use. Attempts have therefore been made to provide winch bars which are safer than the conventional bars with tapered tips as shown, for example, in U.S. Pat. No. 3,697,045 to Farley.

U.S. Pat. No. 2,838,281 to Flippin shows a winch bar which has a special notch adapted to engage a shoulder on the winding drum. However, such winch bars do not fit, or do not provide the desired improved safety, when used on conventional winding drums of the type having an annular end on the drum with a plurality of apertures extending therethrough. The winch bar for such winches passes completely through diametrically opposite apertures on each side of the annular portion of the drum.

SUMMARY OF THE INVENTION

It is therefore an object of the invention to provide an improved winch bar which is capable of fitting conventional winding drums having annular portions with circumferentially spaced-apart apertures for winding the winch.

It is also an object of the invention to provide an improved winch bar which securely engages such conventional winding drums and is not subject to slippage as with some prior art winch bars.

It is a further object of the invention to provide an improved winch bar which is simple and rugged in construction and is economical to produce.

In accordance with these objects, there is provided a winch bar for winding a winch having a winding &urn with an annular wall, a central opening and a plurality of winch bar receiving apertures extending diametrically through the drum on opposite sides of the wall. The winch bar has an outer portion dimensioned to extend through the apertures, an inner portion larger than the apertures, and a first shoulder between the inner portion and the outer portion. The outer portion includes an outer tip which tapers outwardly, a first segment of reduced section adjacent the tip which is dimensioned to receive the wall of the drum on a first side thereof, a second shoulder between the tip and the first segment and a second segment of reduced section adjacent the first shoulder which is dimensioned to receive the wall of the drum on a second side thereof. There is a third segment of larger section than the first and second segments and located therebetween. The third segment is dimensioned to fit within the central opening of the winding drum between the first and second sides of the annular wall.

DESCRIPTION OF THE PREFERRED EMBODIMENTS

Figure 1:
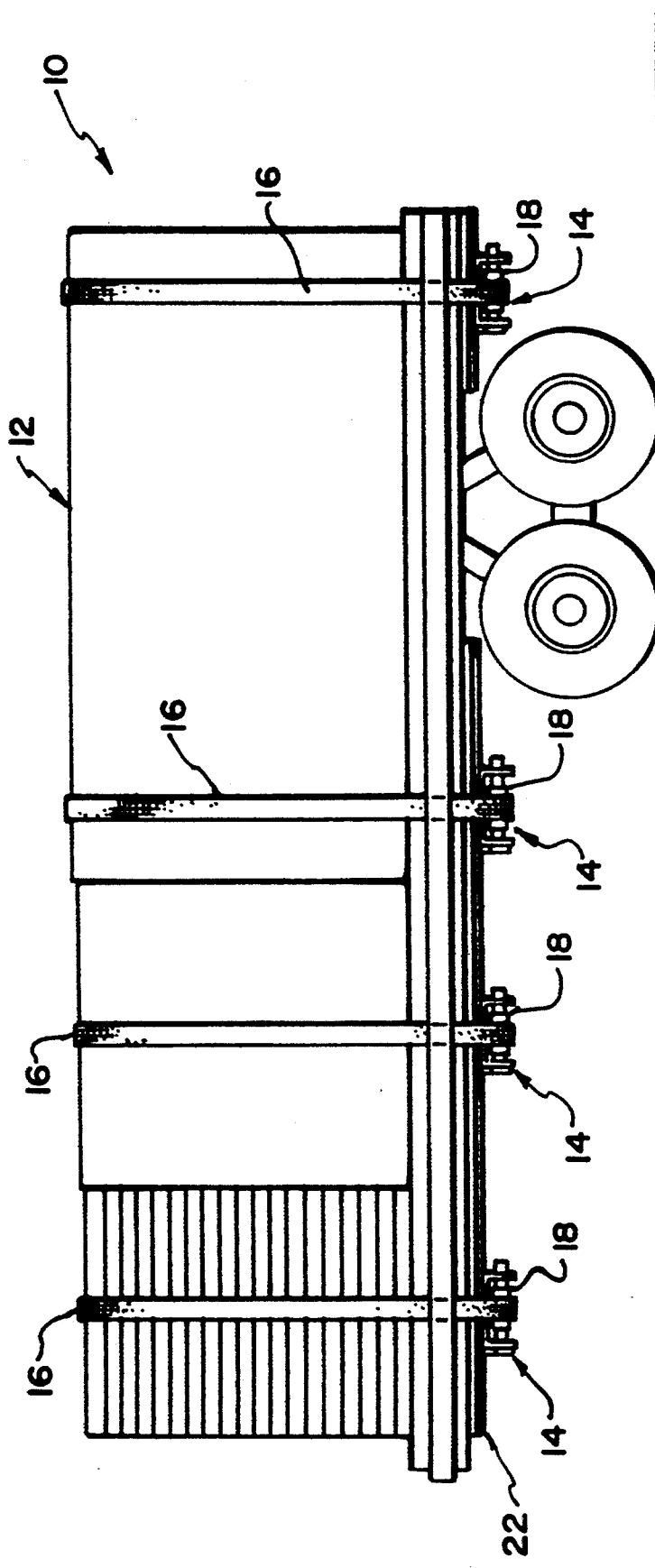
FIG. 1 is a side elevation of a vehicle trailer having a load thereon and a plurality of spaced-apart winches and associated tie-down straps.

With reference to FIG. 1, this shows a conventional truck trailer 10 with a load 12 located thereon. There is a plurality of apparatuses 14 for securing the load. Each apparatus includes a tie-down strap 16 which is of nylon in this embodiment. Other flexible, tension members such as chains or cables could be substituted and come within the definition of "tie-down strap" as used herein. Each apparatus also includes a winch 18 used to tighten the straps over the load.

Figure 2:
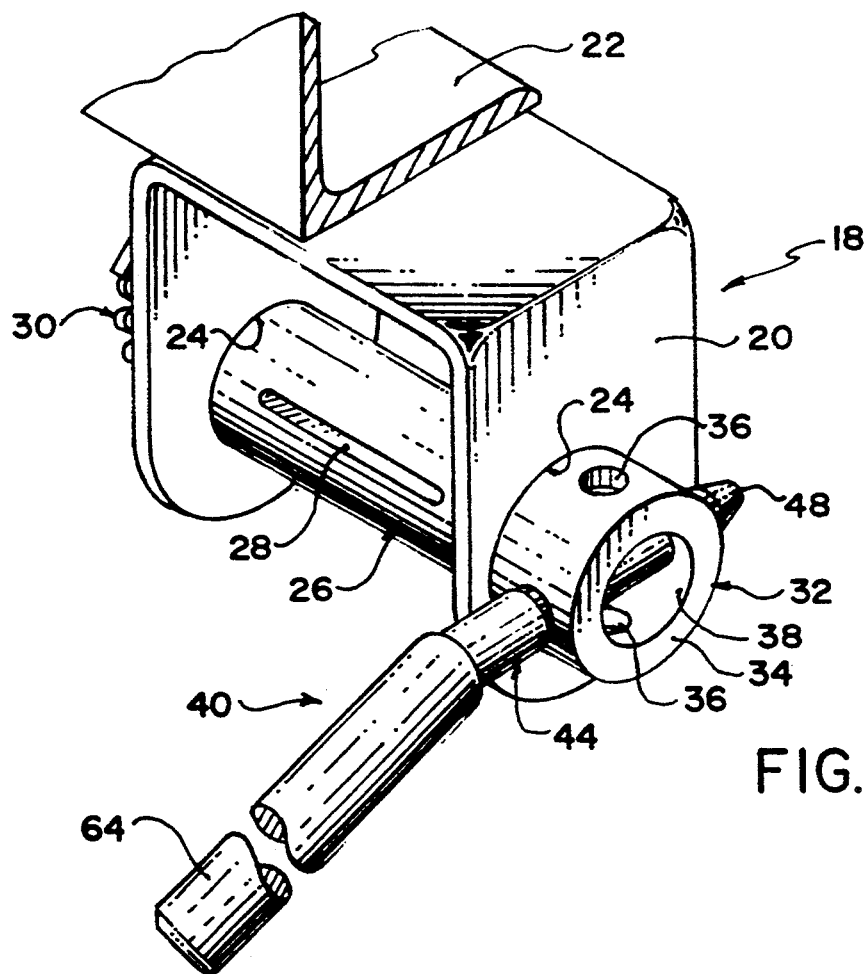
FIG. 2 is an isometric view of one of the winches thereof equipped with a winch bar according to a first embodiment of the invention.

Referring to FIG. 2, this shows one of the winches 18 in more detail. Each winch has a bracket 20 which is inverted U-shaped in this embodiment. The top of the bracket is connected to the truck frame 22 on one side of the trailer. The bracket has a pair of spaced-apart circular openings 24 which receive a winding drum 26 having a strap-receiving slot 28 therein. There is a ratchet mechanism 30 at one end of the drum which is conventional in nature and is operatively connected between the drum and the bracket. This prevents the drum from releasing the strap as it is tightened until the ratchet is manually released.

The drum has an annular portion 32 at the end opposite the ratchet mechanism. The annular portion includes an annular wall 34 with a plurality of winch bar receiving apertures 36 extending diametrically therethrough.

Figure 3:
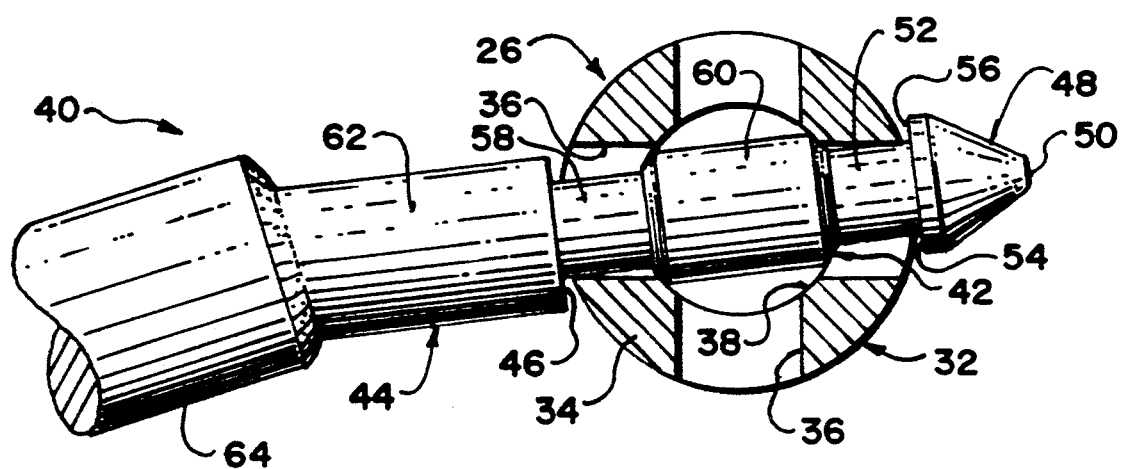
FIG. 3 is a fragmentary side elevation of the outer end of the winch bar of FIG. 2, showing the winding drum in section.

As may be seen in FIG. 3, there are two sets of apertures 36 in this embodiment which are perpendicular to each other. The exact number of pairs of apertures is not critical however. The drum also has a central opening 38 located within the annular wall 34.

There is a winch bar 40 releasably fitted onto the winding drum. The winch bar has an outer portion 42 dimensioned to extend through the apertures 36. The bar also has an inner portion 44 which is larger than the apertures. There is first shoulder 46 between the inner portion and the outer portion acting as a stop to prevent further insertion of the winch bar into the apertures.

The outer portion includes an outer tip 48 which is conical in shape in this example, tapering outwardly to end 50 of the winch bar. The outer portion 42 includes a first segment 52 of the bar which has a reduced section compared to inner end 54 of the tip, thus forming a second shoulder 56 therebetween. There is a second segment 58 of reduced section adjacent the first shoulder 46. The outer portion 42 has a third segment 60 of the bar which is enlarged compared to the segments 52 and 58. There is also a fourth segment 62 forming part of the inner portion 44. The shoulder 46 is between segments 58 and 62.

As seen in FIG. 3, the first and second segments 52 and 58 are of a length such that they closely receive the opposite sides of the wall 34 of the drum while segment 60 fits within the central opening 38. Thus the wall 34 is secured between shoulder 46 and segment 60 on one side and between shoulder 56 and segment 60 on the other side. The wall is received on top of segment 52 in the position of FIG. 3 and against the bottom of segment 58 as the winch bar is levered downwardly to wind the drum. It may be seen that slipping of the winch bar out of the drum is thus prevented when the winch bar is properly inserted as shown.

The segments 52, 58, 60 and 62 are circular in section in the embodiment of FIG. 2 and 3. Inner end 54 of the tip and the third segment 60 have equal diameters in this example. The first and second segments 52 and 58 have diameters which are less than the diameters at the inner end of the tip and of the third segment. Segment 58 is slightly larger than segment 52 in this example. It may also be seen that the tip, the first, second, third and fourth segments of the bar are co-axial in this embodiment. The winch bar has an elongated handle 64 which is connected to the segment 62 by welding or the like and extends outwardly therefrom at an acute angle as best seen in FIG. 3.

Figure 4:
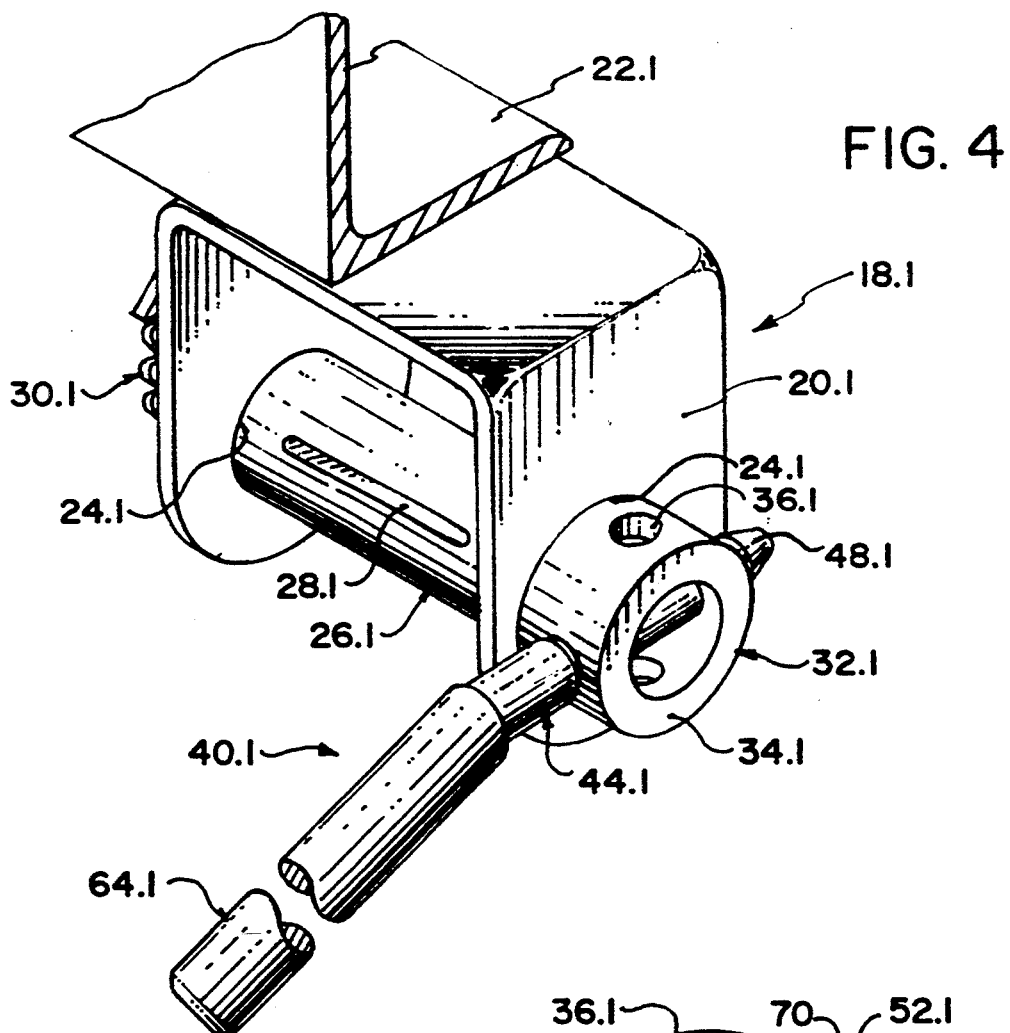
FIG. 4 is a view similar to FIG. 2 of the winding drum with a winch bar according to an alternative embodiment of the invention.
Figure 5:
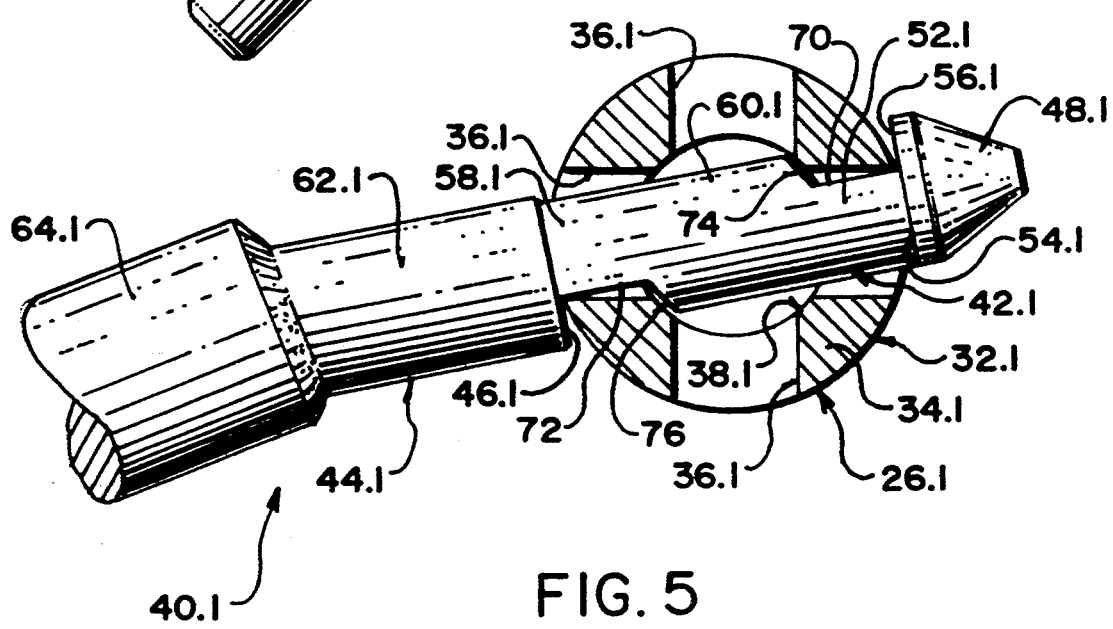
FIG. 5 is a view similar to FIG. 3, showing the winch bar of FIG. 4.

However, it is not critical that all of the sections are circular. For example, an alternative embodiment is shown in FIG. 4 and 5 where like parts have like numbers with the additional designation "0.1". This embodiment will therefore be described only with reference to the differences between the two embodiments.

The winches and winding drums are identical for the two embodiments. The only differences concern the structure of the winch bar 40.1. In this case, the first and second segments 52.1 and 58.1 of reduced section are formed by notches 70 and 72 on opposite sides of the winch bar. Notch 70 adjacent the tip 48.1 is on the top of the bar, while notch 72 is on the bottom of the bar. Notches on opposite sides of the bar are sufficient because each segment only engages the drum on one side as discussed relative to FIG. 3.

The shoulders 56.1 and 46.1 extend perpendicularly with respect to the longitudinal axis of the third segment 60.1. However, the opposite ends 74 and 76 of the two notches are acutely-angled.

Thus they better conform to the shape of the inside of the annular wall when the winch bar is properly positioned for use as shown in FIG. 5. The opposite sides of the annular wall are effectively held by the notches while slipping in both directions is prevented by shoulders 46.1 and 56.1.

It will be understood by someone skilled in the art that many of the details provided above are by way of example only and are not intended to limit the scope of the invention which is to be interpreted with reference to the following claims.

What is claimed is:

1. A winch bar for winding a winch having a winding drum with an annular wall, a central opening and a plurality of winch bar receiving apertures extending diametrically through the drum on opposite sides of the wall, the winch bar comprising:

an outer portion dimensioned to extend releasably through the apertures, an inner portion larger than the apertures, a first shoulder between the inner portion and the outer portion, the outer portion including an outer tip which tapers outwardly, a first segment of the bar having a reduced section compared to an adjacent portion of the tip and which is dimensioned to receive the wall of the drum on a first side thereof, a second shoulder between the tip and the first segment, a second segment of reduced section adjacent the first shoulder which is dimensioned to receive the wall of the drum on a second side thereof, and a third segment of larger section than the first and second segments and located therebetween, the third segment being dimensioned to fit within the central opening of the winding drum between the first and second sides of the annular wall.

2. A winch bar as claimed in claim 1, wherein the segments of the winch bar are circular in section, the tip having an inner end adjacent the second shoulder, the inner end of the tip and the third segment having equal first diameters, the first and second segments having diameters which are smaller than the first diameters.

3. A winch bar as claimed in claim 2, wherein the bar has a fourth segment extending inwardly from the first shoulder which is co-axial with the first, second and third segments, and a handle connected to the fourth segment at an acute angle.

4. A winch bar as claimed in claim 1, wherein the first and second segments are formed by notches on opposite sides of the winch bar.

5. A winch bar as claimed in claim 4, wherein the outer portion of the winch bar has a longitudinal axis extending centrally through the third segment, the first and second shoulders being perpendicular to the axis on opposite sides thereof, the notches having acutely angled ends opposite the shoulders.

6. A winch for securing loads, comprising:
a mounting bracket;
a winding drum rotatably mounted on the bracket, the winding drum having an annular wall with a central opening and a plurality of winch bar receiving apertures extending diametrically through the drum on opposite sides of the wall;
a ratchet mechanism operatively connected between the bracket and the drum; and
a winch bar having an outer portion removably extending through the apertures of the winding drum, an inner portion larger than the apertures, and a first shoulder between the inner portion and the outer portion, the outer portion including an outer tip outside the drum which tapers outwardly, a first segment of the bar which has reduced section compared to an adjacent portion of the tip and which receives the wall of the drum on a first side thereof, a second shoulder between the tip and the first segment against the outside of the drum, a second segment of reduced section adjacent the first shoulder which receives the wall of the drum on a second side thereof, and a third segment of larger section than the first and second segments and located within the central opening of the winding drum between the first and second sides of the annular wall.

7. A winch as claimed in claim 6, wherein the segments of the outer portion and the tip are circular in section, the tip having an inner end adjacent the second shoulder, the inner end of the tip and the third segment having equal first diameters, the first and second segments having equal second diameters which are smaller than the first diameters.

8. A winch as claimed in claim 7, wherein the bar has a fourth segment exterior to the drum which extends away from the first shoulder and which is co-axial with the first, second and third segments, and a handle connected to the fourth segment at an acute angle.

9. A winch bar as claimed in claim 6, wherein the annular wall of the drum has a thickness and the central opening has a diameter, the first and second segments having a length equal to the wall thickness and the third segment having a length equal to the diameter of the opening.

10. A winch as claimed in claim 9, wherein the first and second segments are formed by notches on opposite sides of the winch bar.

* * * * *